United States Patent
Onozaki

[11] Patent Number: 5,268,902
[45] Date of Patent: Dec. 7, 1993

[54] DATA TRANSMISSION APPARATUS

[75] Inventor: Manabu Onozaki, Nara, Japan

[73] Assignee: Sharp Kabushiki Kaisha, Osaka, Japan

[21] Appl. No.: 741,625

[22] Filed: Aug. 7, 1991

[30] Foreign Application Priority Data

Aug. 9, 1990 [JP] Japan .................. 2-213371

[51] Int. Cl.$^5$ .......................... H04J 3/24; H04J 3/02
[52] U.S. Cl. ............................ 370/94.1; 370/85.6; 340/825.5
[58] Field of Search .............. 370/94.1, 60, 65, 58.1, 370/58.2, 54.0, 58.3; 340/825.8, 825.06, 825.5

[56]  References Cited

U.S. PATENT DOCUMENTS

| 4,677,616 | 6/1987 | Franklin | 370/94.1 |
| 4,736,369 | 4/1988 | Barzilai et al. | 370/82 |
| 4,970,714 | 11/1990 | Chen et al. | 370/94.1 |
| 4,985,890 | 1/1991 | Matsumoto et al. | 370/94.1 |
| 5,008,880 | 4/1991 | Azuma | 370/94.1 |
| 5,063,562 | 11/1991 | Barzilai et al. | 370/94.1 |

Primary Examiner—Douglas W. Olms
Assistant Examiner—Ajit Patel
Attorney, Agent, or Firm—Birch, Stewart, Kolasch & Birch

[57]  ABSTRACT

A data transmission apparatus includes a word number counting control portion and an arbitration portion. The word number counting control portion generates a transmission acknowledging signal in response to a transmission acknowledging signal received from a first data transmission path. The arbitration portion receives the transmission acknowledging signal from the word number counting control portion and a transmission acknowledging signal from a second data transmission path and applies transmission acknowledging signals to either the first data transmission path or the second data transmission path in the order of arrival. Packets are transmitted to a memory control portion in the succeeding stage from the data transmission path to which the transmission acknowledging signals are applied. Any of the packets includes a flag. The word number counting portion dynamically changes the number of packets to be successively transmitted from the first data transmission path to the memory control portion in response to the flag.

10 Claims, 10 Drawing Sheets ant application Ser. No. 497,221, filed Mar. 22, 1990, commonly
DATA TRANSMISSION APPARATUS

CROSS-REFERENCE TO RELATED APPLICATION

This application is related to the copending application Ser. No. 497,221, filed Mar. 22, 1990, commonly assigned with the present invention.

BACKGROUND OF THE INVENTION

1. Field of the Invention

The present invention relates generally to a data transmission apparatus for controlling a flow of packets in a data transmission path and a method of operating the same.

2. Description of the Background Art

Some of data processors such as data flow type information processors employ data transmission paths using self-oscillation circuits. An arbitration portion is provided, for example, when transmitting packets flowing through two input side data transmission paths provided in parallel with each other to one output side data transmission path in the order of arrival or when in performing read and write with respect to the same memory in the order of arrival of the packets. The arbitration portion is supplied with signals indicative of an arrival of a packet and the portion applies a transmission acknowledging signal to the data transmission path which has first generated the signal. A word number counting portion is provided when a plurality of packets are to be collectively treated. The word counting portion performs arbitration such that a prescribed number of packets are successively transmitted.

FIG. 16 shows one example of a conventional data transmission apparatus.

In FIG. 16, data transmission paths 100 and 200 are provided in parallel to each other on the input side. The data transmission path 100 applies a transmission acknowledging signal AK100 to a data transmission path (not shown) at the preceding stage and receives a transmission signal C100 from that data transmission path. The data transmission path 100 also receives a transmission acknowledging signal AK301 from an arbitration portion 500 and applies a transmission signal C301 to a data transmission path 300 on the output side. Similarly, the data transmission path 200 applies a transmission acknowledging signal AK200 to a data transmission path (not shown) at the preceding stage and receives a transmission signal C200 from that data transmission path. The data transmission path 200 also receives a transmission acknowledging signal AK302 from the arbitration portion 500 and applies a transmission signal C302 to the data transmission path 300 on the output side. A word number counting portion 400 receives transmission acknowledging signals AK100 and AK200 from the data transmission paths 100 and 200, respectively and applies transmission acknowledging signals AK101 and AK201 to the arbitration portion 500. The arbitration portion 500 receives a transmission acknowledging signal AK300 from the data transmission path 300 on the output side.

The data transmission path 100 holds and outputs a received n-bit data DATA1 in response to the transmission signal C100 when the transmission acknowledging signal AK301 is at an acknowledged state. Similarly, when the transmission acknowledging signal AK302 is at an acknowledged state, the data transmission path 200 holds and outputs a received n-bit data DATA2 in response to the transmission signal C200.

The word number counting portion 400 counts the number of packets transmitted from the data transmission path 100 to the data transmission path 300 in response to the transmission acknowledging signal AK100 to output the transmission acknowledging signal AK101. The word number counting portion 400 also counts the number of packets transmitted from the data transmission path 200 to the data transmission path 300 in response to the transmission acknowledging signal AK200 to generate the transmission acknowledging signal AK201. The arbitration portion 500 causes one of the transmission acknowledging signals AK301 and AK302 to enter an acknowledged state and the other to enter an inhibited state. The arbitration portion 500 maintains the state of the transmission acknowledging signals AK301 and AK302 in response to the transmission acknowledging signals AK101 and AK201 until a prescribed number of packets are successively transmitted from one of the data transmission paths 100 and 200 to the data transmission path 300.

A prescribed number of packets are successively transmitted from one of the data transmission paths 100 and 200 to the data transmission path 300 in the order of arrival in this way.

For the above-described conventional data transmission apparatus, the number of packets to be successively transmitted is predetermined depending on an arrangement of the word number counting portion 400, so that the number of packets to be collectively treated is constant at any time. Therefore, when packets to be collectively treated change in number, it is necessary to fix the number of packets at a prescribed number by adding dummy packets or the like.

SUMMARY OF THE INVENTION

An object of the present invention is to provide a data transmission apparatus capable of efficiently controlling packet flow and a method of operating such apparatus.

Another object of the present invention is to provide a data transmission apparatus capable of efficiently controlling packet, flow without adding a packet even when packets to be collectively treated change in number, and a method of operating such apparatus.

A further object of the present invention is to efficiently control packet flow with the least increase of hardware.

A data transmission apparatus according to the present invention includes a plurality of data transmission paths, an arbitration portion and a control portion. The plurality of data transmission paths are provided in parallel with each other to transmit packets. The arbitration portion transmits packets flowing through the plurality of data transmission paths to a succeeding stage portion in the order of arrival. Each packet has information on the number of packets to be successively transmitted. Based on the information of the packets flowing through any of the plurality of data transmission paths, the control portion dynamically changes the number of packets to be successively transmitted from said data transmission path to the succeeding stage portion.

In this data transmission apparatus, information concerning the number of packets to be collectively treated is applied from packets flowing through data transmission paths to the control portion which dynamically changes the number of packets to be collectively transmitted based on that information. Therefore, even when the number of packets to be collectively treated is changed, it is possible to efficiently control packet flow without adding a packet.

As described above, the present invention allows packets flowing through a plurality of data transmission paths to be transmitted to the succeeding stage portion in the order of arrival and also allows the number of packets to be successively transmitted to be dynamically changed, thereby efficiently controlling packet flow with the least increase of hardware.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings, which are given by way of illustration only, and thus are not limitative of the present invention, and wherein.

DESCRIPTION OF THE PREFERRED EMBODIMENTS

An embodiment of the present invention will be described in detail with reference to the drawings.

Figure 1:
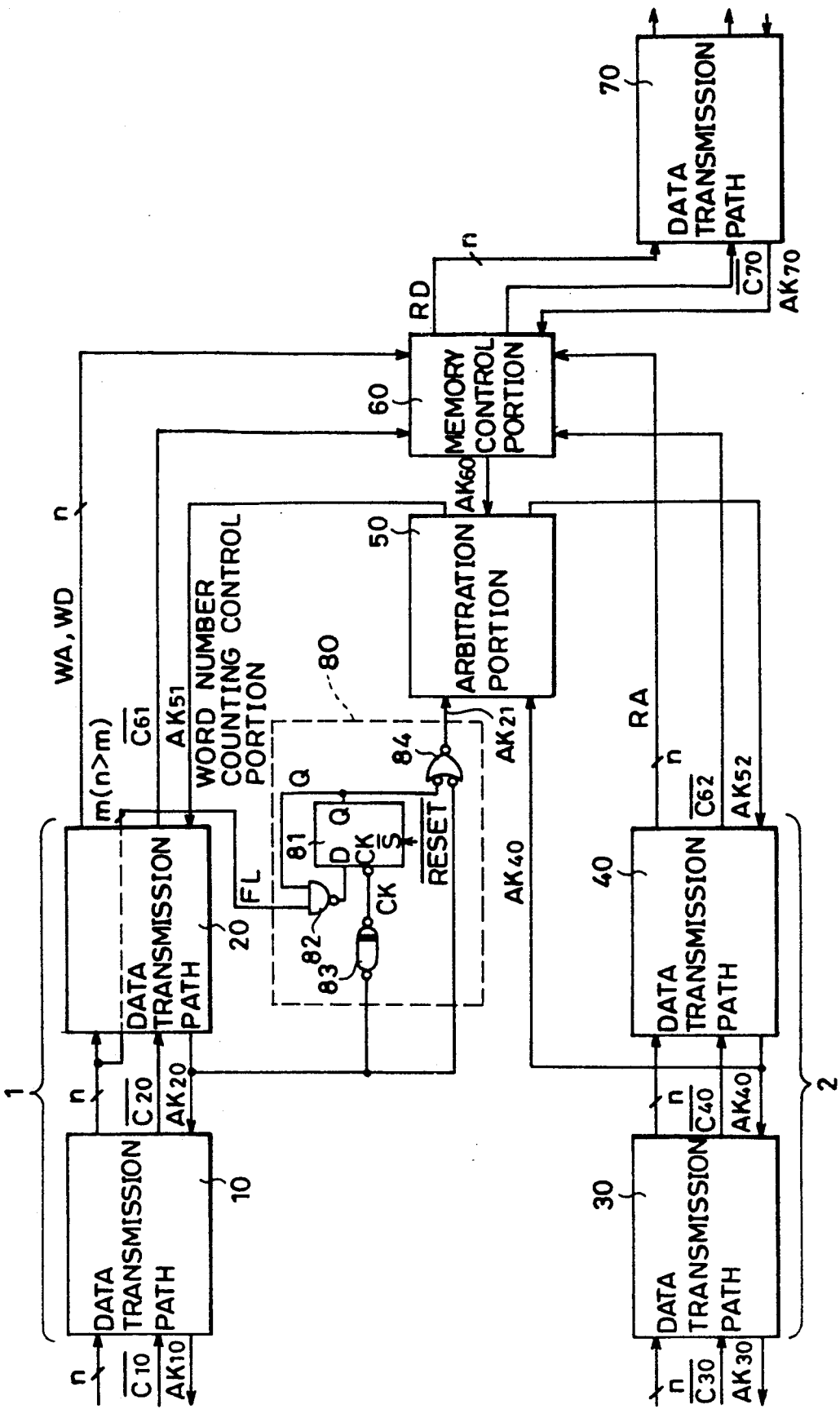
FIG. 1 is a block diagram showing an arrangement of a data transmission apparatus according to one embodiment of the present invention.

FIG. 1 is a block diagram showing an arrangement of a data transmission apparatus according to one embodiment of the present invention.

In FIG. 1, data transmission paths 10 and 20 constitute a first input side transmission path 1 and data transmission paths 30 and 40 constitute a second input side transmission path. The data transmission path 2. 10 applies a transmission acknowledging signal AK10 to a data transmission path (not shown) at a preceding stage and receives a transmission signal $\overline{C10}$ from that data transmission path. The data transmission path 10 also receives a transmission acknowledging signal AK20 from the data transmission path 20 and applies a transmission signal $\overline{C20}$ to the data transmission path 20. The data transmission path 20 receives a transmission acknowledging signal AK51 from an arbitration portion 50 and applies a transmission signal $\overline{C61}$ to a memory control portion 60. Similarly, the data transmission path 30 applies a transmission acknowledging signal AK30 to a data transmission path (not shown) at the preceding stage and receives a transmission signal $\overline{C30}$ from that data transmission path. The data transmission path 30 also receives a transmission acknowledging signal AK40 from the data transmission path 40 and applies a transmission signal $\overline{C40}$ to the data transmission path 40. The data transmission path 40 receives a transmission acknowledging signal AK52 from the arbitration portion 50 and applies a transmission signal $\overline{C62}$ to the memory control portion 60.

The memory control portion 60 receives a transmission acknowledging signal AK70 from a data transmission path 70, applies a transmission signal $\overline{C70}$ to the data transmission path 70 and applies a transmission acknowledging signal AK60 to the arbitration portion 50.

The memory control portion 60 outputs packets including read data RD, which packets are transmitted onto the data transmission path 70.

The first input side transmission path 1 transmits an n-bit packet including a write address WA and write data WD to the memory control portion 60. The second input side transmission path 2 transmits an n-bit packet including a read address RA to the memory control portion 60.

The first input side transmission path 1 and the second input side transmission path 2 can differ from each other in the number of bits.

A word number control portion 80 dynamically changes the number of packets to be successively transmitted from the data transmission path 20 to the memory control portion 60. The word number control portion 80 comprises a D type flip-flop 81, an NAND gate 82, a delay line 83 and an AND gate 84. The transmission acknowledging signal AK20 is applied as a clock signal CK through the delay line 83 to a clock terminal of the D type flip-flop 81 and also to one input terminal of the AND gate 84. One input terminal of the gate 82 receives an m-bit flag FL included in a packet transmitted from the data transmission path 10 to the data transmission path 20 and the other input terminal receives an output signal Q of the flop-flop 81. The output signal of the gate 82 is applied to the data input terminal of the flip-flop 81. The output signal Q of the flip-flop 81 is also applied to the other input terminal of the gate 84. The output signal of the gate 84 is applied as a transmission acknowledging signal AK21 to the arbitration portion 50.

Figure 2A:
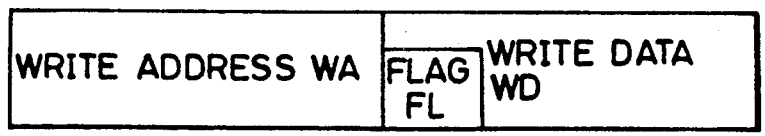
FIGS. 2A, 2B and 3 are diagrams showing field arrangements of the packets flowing through the data transmission apparatus of FIG. 1.
Figure 2B:
Figure 2B:
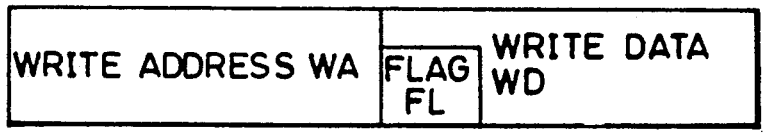
Figure 3:
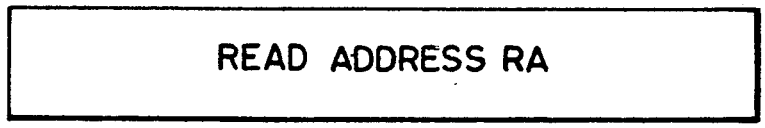

FIGS. 2A and 2B are diagrams showing arrangements of packets transmitted through the first input side transmission path 1 and FIG. 3 is a diagram showing an arrangement of a packet transmitted through the second input side transmission path 2.

The packet shown in FIG. 2A is transmitted to carry out arbitration for each packet and the two packets shown in FIG. 2B are successively transmitted when two packets are collectively treated. A packet transmitted through the first input side transmission path 1 includes a write address WA, write data WD and a flag FL as shown in FIGS. 2A and 2B. A packet transmitted through the second input side transmission path 2 includes a read address RA as shown in FIG. 3.

Figure 4:
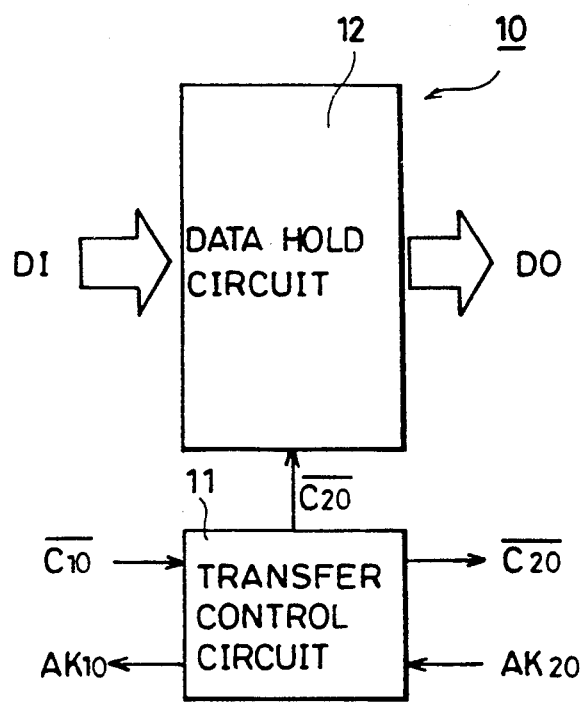
FIG. 4 is a block diagram showing an arrangement of a data transmission path.

FIG. 4 is a block diagram showing an arrangement of a data transmission path 10.

The data transmission path 10 comprises a transfer control circuit 11 and a data hold circuit 12. The data hold circuit 12 holds input data D1 and outputs the same as output data DO in response to a fall of a transmission signal $\overline{C20}$ applied from the transfer control circuit 11.

The other data transmission paths 20, 30, 40 and 70 have the same arrangement as that shown in FIG. 4.

Figure 5:
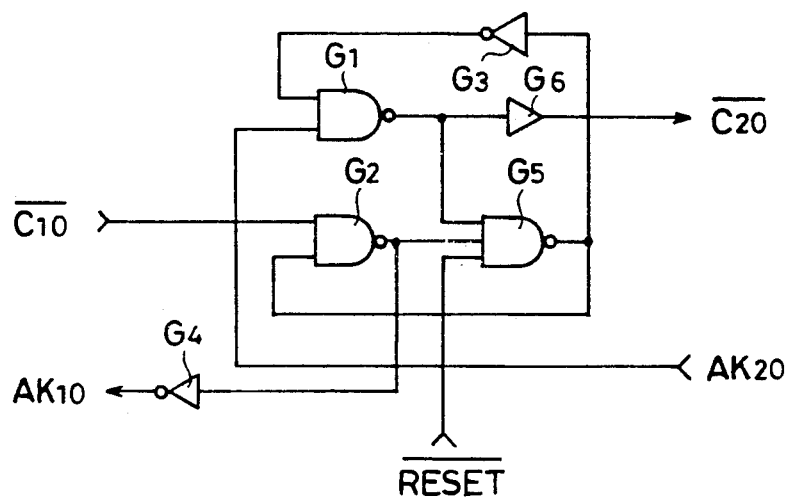
FIG. 5 is a circuit diagram showing an arrangement of a transfer control circuit.
Figure 6:
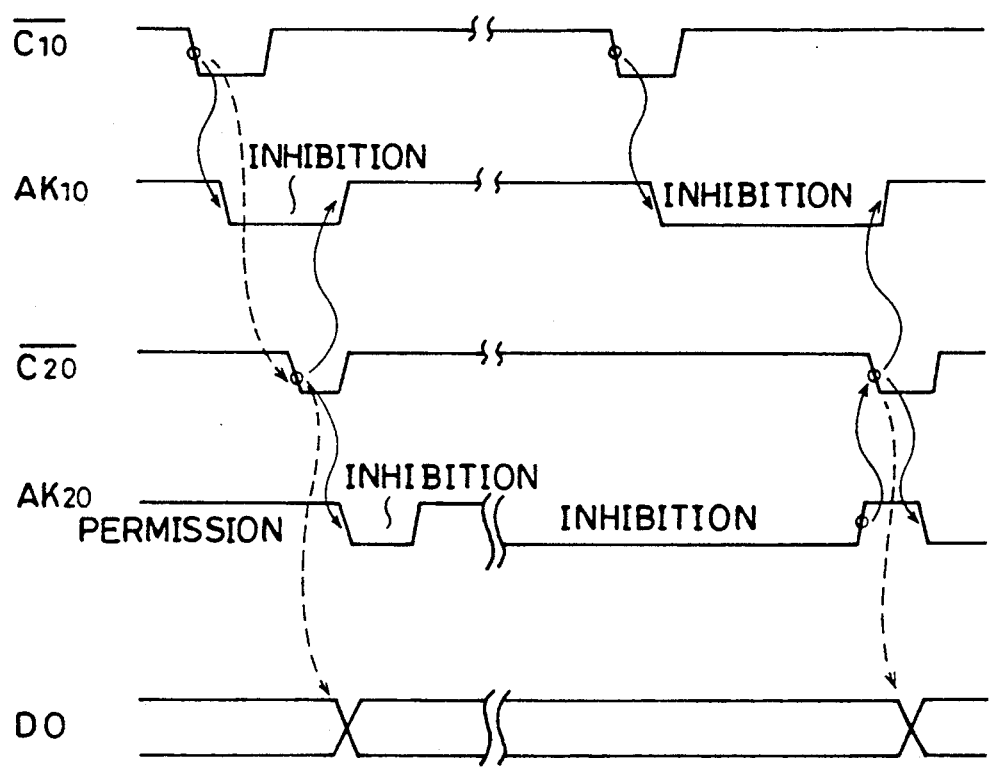
FIG. 6 is a timing chart explaining operation of the transfer control circuit.

FIG. 5 is a circuit diagram showing the arrangement of the transfer control circuit 11 and FIG. 6 is a timing chart explaining operation of the transfer control circuit 11.

As shown in FIG. 5, the transfer control circuit 11 includes NAND gates G1, G2 and G5, inverters G3 and G4 and a buffer G6.

Description will be first given of a case where a data transmission path at a subsequent stage is empty.

When a data transmission path at the subsequent stage is empty, the transfer control circuit is supplied with a "H" (logical high) level transmission acknowledging signal AK20 by the subsequent stage transfer control circuit. When a transmission signal $\overline{C10}$ applied from the preceding stage portion falls to a "L" (logical low) level, the output of the NAND gate G2 attains a "H" level. As a result, a transmission acknowledging signal AK10 output from the inverter G4 attains a "L" level (inhibited state). Meanwhile, the output of the NAND gate G5 attains a "L" level and the output of the inverter G3 attains a "H" level. At this time, with the transmission acknowledging signal AK20 being at a "H" level, the output of the NAND gate G1 falls to a "L" level. As a result, a transmission signal $\overline{C20}$ falls to a "L" level.

The data hold circuit 12 shown in FIG. 4 holds the input data D1 and outputs the same as output data DO in response to the fall of the transmission signal C20.

The transfer control circuit at the subsequent stage receiving the transmission signal $\overline{C20}$ brings the transmission acknowledging signal AK20 to a "L" level in response to the fall of the transmission signal $\overline{C20}$.

Meanwhile, the output of the NAND gate G5 and the output of the inverter G3 attain a "H" level and a "L" level, respectively, in response to the fall of the output of the NAND gate G1 to a "L" level. The output of the NAND gate G1 again rises to a "H" level. As a result, the transmission signal $\overline{C20}$ rises to a "H" level again. As described in the foregoing, the transmission signal falls to a "L" level and after a lapse of fixed time it rises to a "H" level.

The transmission signal $\overline{C10}$ applied from the preceding stage portion rises to a "H" level after a lapse of fixed time. Accordingly, the output of the NAND gate G2 falls to a "L" level and the output of the inverter G4 rises to a "H" level. As a result, the transmission acknowledging signal AK10 again attains a "H" level (permission state).

As described above, when the transmission acknowledging signal AK20 applied from the transfer control circuit at the subsequent stage is at a "H" level (permission state), the transmission acknowledging signal AK10 to be applied to the preceding stage portion attains a "L" level (inhibited state) in response to the fall of the transmission signal $\overline{C10}$ applied from the preceding stage portion and after a lapse of fixed time, the transmission signal $\overline{C20}$ be applied to the transfer control circuit at the subsequent stage falls to a "L" level.

Description will be given of a case where a data transmission path at the subsequent stage is full.

In this case, the transmission acknowledging signal AK20 applied from the transfer control circuit at the subsequent stage is at a "L" level (inhibited state). When the transmission signal $\overline{C10}$ applied from the preceding stage portion falls to a "L" level, the output of the NAND gate G2 attains a "H" level and the output of the inverter G4 falls to a "L" level. As a result, the transmission acknowledging signal AK10 falls to a "L" level. When the transmission acknowledging signal AK20 applied from the transfer control circuit at the subsequent stage is at a "L" level (inhibited state), the output of the NAND gate G1 is at a "H" level. The transmission signal $\overline{C20}$ to be applied to the transfer control circuit at the subsequent stage therefore maintains a "H" level as long as the transmission acknowledging signal AK20 is at a "L" level. As a result, no data is transmitted from the data transmission path 10 to the data transmission path 20 (see FIG. 1).

When the transmission acknowledging signal AK20 applied from the transfer control circuit at the subsequent stage rises to a "H" level (permission state), the output of the NAND gate G1 falls to a "L" level. As a result, the transmission signal $\overline{C20}$ to be applied to the transfer control circuit at the subsequent stage falls to a "L" level. The data hold circuit 12 shown in FIG. 4 holds the input data D1 and outputs the same as the output data DO in response to the fall of the transmission signal $\overline{C20}$.

Meanwhile, the transfer control circuit at the subsequent stage causes the transmission acknowledging signal AK20 to fall to a "L" level (inhibited state) after a lapse of fixed time in response to the fall of the transmission signal $\overline{C20}$ applied from the transfer control circuit 11. In response to a rise of the transmission acknowledging signal AK20 applied from the transfer control circuit at the subsequent stage, the transmission acknowledging signal AK10 to be applied to the preceding stage portion rises to a "H" level (permission state) after a lapse of fixed time.

As described above, when the transmission acknowledging signal AK20 applied from the transfer control circuit at the subsequent stage is at a "L" level (inhibited state), the transmission signal $\overline{C20}$ to be applied to the transfer control circuit at the subsequent stage does not fall to a "L" level. In other words, when the data transmission path 20 at the subsequent stage is full, data transmission from the data transmission path 10 to the data transmission path 20 is kept waiting until the transmission acknowledging signal AK20 attains a "H" level (permission state).

Figure 7:
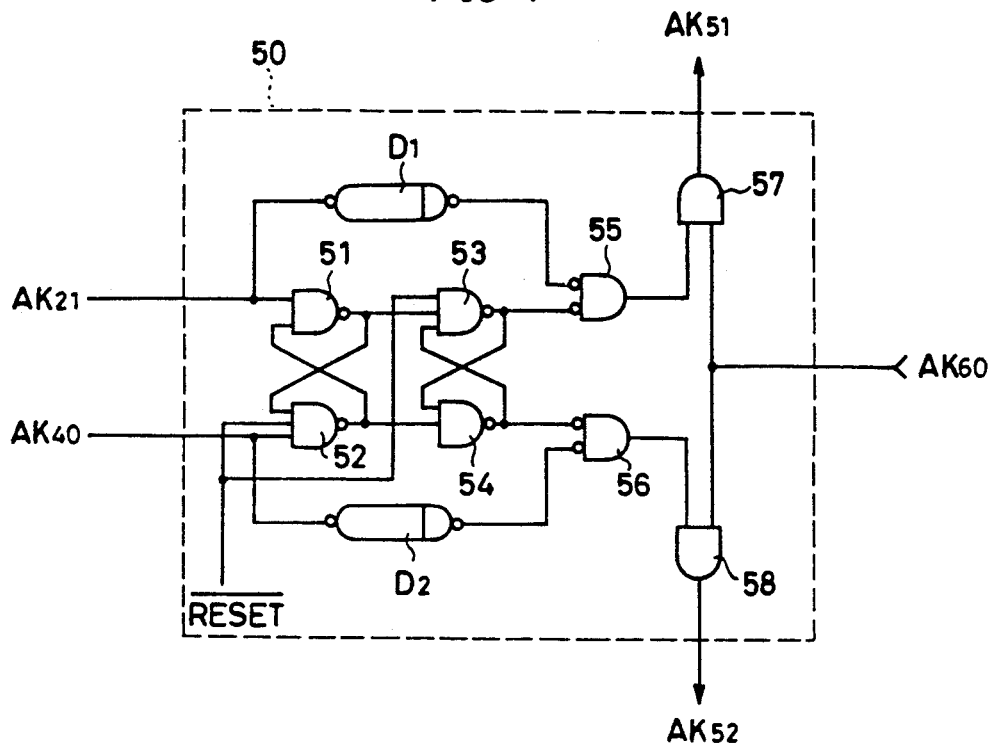
FIG. 7 is a circuit diagram showing an arrangement of an arbitration portion.

FIG. 7 is a circuit diagram showing an arrangement of the arbitration portion 50.

The arbitration portion 50 comprises a first flip-flop including NAND gates 51 and 52, a second flip-flop including NAND gates 53 and 54, delay elements D1 and D2, NOR gates 55 and 56 and AND gates 57 and 58.

With the transmission acknowledging signal AK60 being at a "H" level (permission state), when the transmission acknowledging signal AK21 first attains a "L" level, the arbitration portion 50 first brings the transmission acknowledging signal AK51 to a "H" level (permission state) and when the transmission acknowledging signal AK40 first attains a "L" level, it brings the transmission acknowledging signal AK52 to a "H" level (permission state).

Consideration will be given to a case where the transmission acknowledging signal AK60 is at a "H" level (permission state).

It is assumed herein that the transmission acknowledging signals AK21 and AK40 are at a "H" level in an initial state. When a reset signal $\overline{RESET}$ attains a "L" level, the output of the gate 52 attains a "H" level and the output of the gate 51 attains a "L" level. The output of the gate 53 attains a "H" level and the output of the gate 54 attains a "L" level. As a result, the outputs of the gates 55 and 56 attain a "L" level and the transmission acknowledging signals AK51 and AK52 attain a "L" level (inhibited state). The reset signal $\overline{RESET}$ rises to a "H" level after a lapse of fixed time.

First, when the transmission acknowledging signal AK21 attains a "L" level, the output of the gate 51 attains a "H" level and the output of the gate 52 attains a "L" level. In addition, the output of the gate 54 attains a "H" level and the output of the gate 53 attains a "L" level. As a result, the output of the gate 55 attains a "H" level and the transmission acknowledging signal AK51 attains a "H" level (permission state).

Then, when the transmission acknowledging signal AK40 attains a "L" level, the output of the gate 52 attains a "H" level, while the output of the gate 51 remains high. Therefore, neither the outputs of the gates 53 and 54 nor the transmission acknowledging signals AK51 and AK52 change.

Thereafter, the output of the gate 51 attains a "L" level at a time point when the transmission acknowledging signal AK21 attains a "H" level. As a result, the output of the gate 53 attains a "H" level and the output of the gate 54 attains a "L" level, so that the output of the gate 55 attains a "L" level and the output of the gate 56 attains a "H" level. As a result, the transmission acknowledging signal AK51 attains a "L" level and the transmission acknowledging signal AK52 attains a "H" level.

Consideration will be given to a case where the transmission acknowledging signal AK60 is at a "L" level (inhibited state). In this case, the transmission acknowledging signals AK51 and AK52 remain low (inhibited state) irrespective of the state of the transmission acknowledging signals AK21 and AK40.

Figure 8:
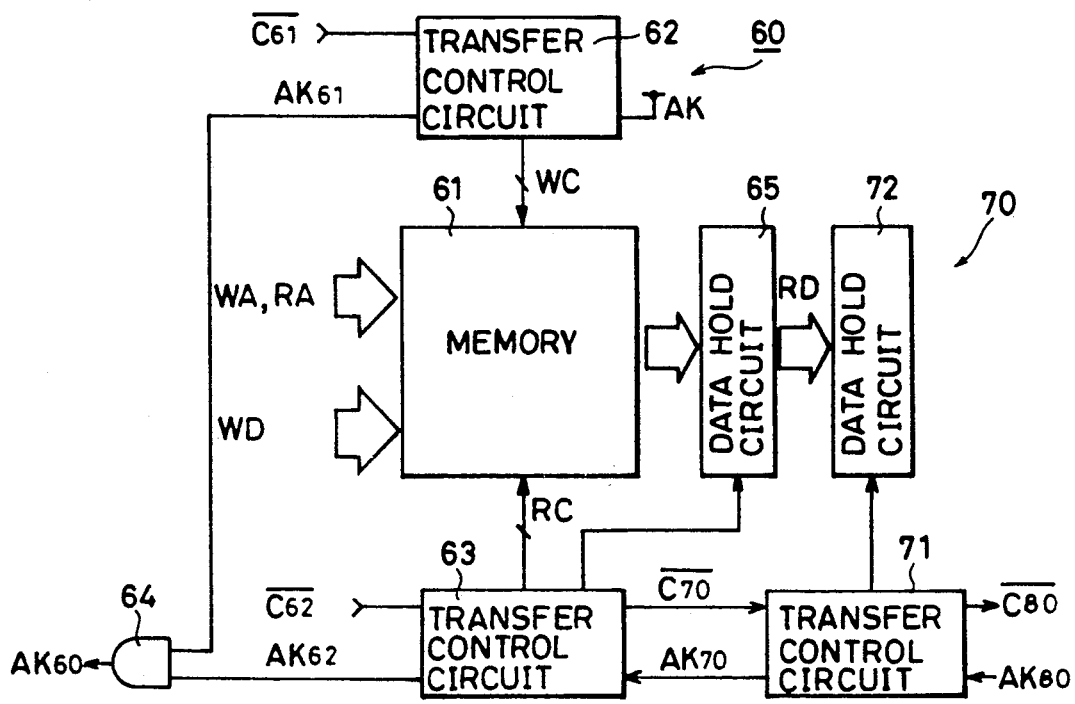
FIG. 8 is a block diagram showing an arrangement of a memory control portion.

FIG. 8 is a block diagram showing the arrangement of the memory control portion 60.

The memory control portion 60 comprises a memory 61, transfer control circuits 62 and 63 and an AND gate 64.

The memory 61 receives a write address WA and a write data WD from the data transmission path 20 (see FIG. 1). The memory 61 also receives a read address RA from the data transmission path 40 (see FIG. 1).

The transfer control circuit 62 applies a write control signal WC to the memory 61 in response to a transmission signal $\overline{C61}$ applied from the data transmission path 20. As a result, write data WD is written at an address designated by a write address WA in the memory 61.

In addition, the transfer control circuit 63 applies a read control signal RC to the memory 61 in response to a transmission signal $\overline{C62}$ applied from the data transmission path 40. As a result, the data at the address designated by the read address WA is read from the memory 61, which data is held in a data hold circuit 65 to output read data RD. The read data RD is applied to the data transmission path 70. The data transmission path 70 includes a transfer control circuit 71 and a data hold circuit 72. The read data RD is held in the data hold circuit 72 and output through the operation of the transfer control circuit 71.

The gate 64 causes the transmission acknowledging signal AK60 to attain a "H" level (permission state) when both of a transmission acknowledging signal AK61 output from the transfer control circuit 62 and a transmission acknowledging signal AK62 output from the transfer control circuit 63 are at a "H" level.

Operation of the word number control portion 80 of FIG. 1 will be described with reference to the timing charts shown in FIGS. 9 and 10.

Description will be first given of a case where transmission is carried out for each packet as shown in FIG. 2A.

It is assumed herein that a packet first arrives at the data transmission path 20 and then, a packet arrives at the data transmission path 40.

Figure 9:
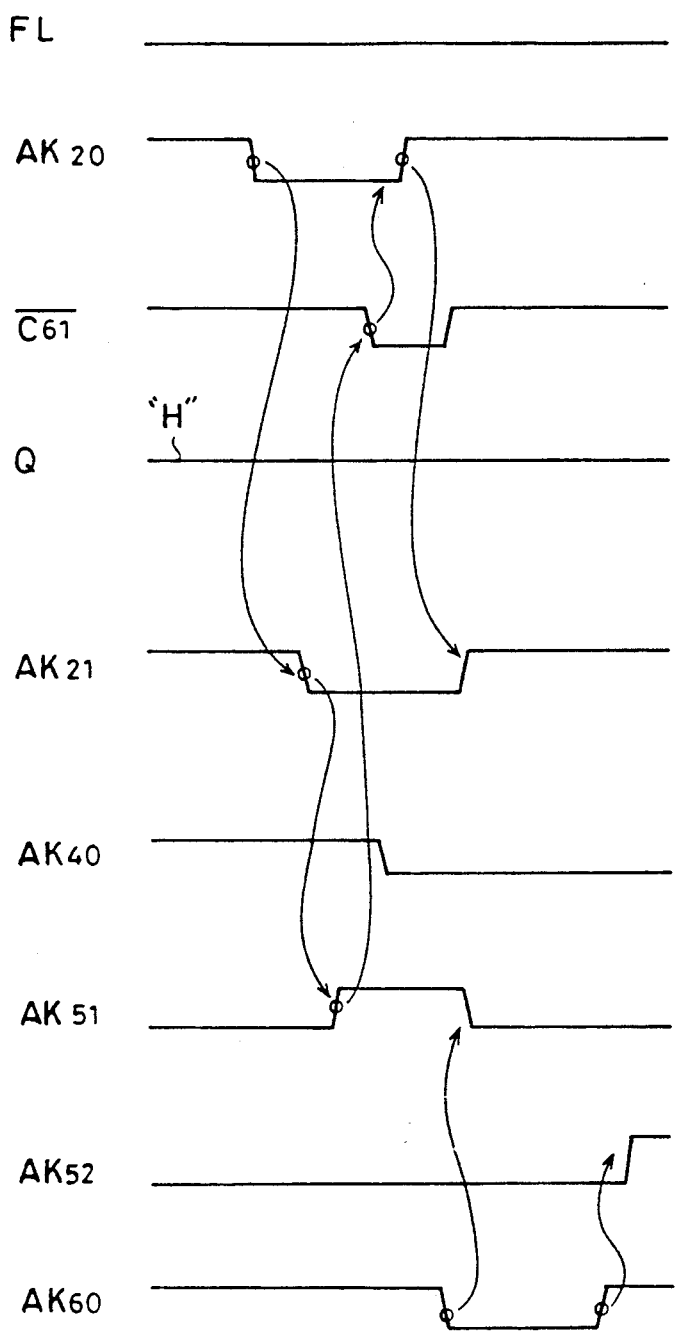
FIGS. 9 and 10 are timing charts explaining operation of a word number control portion.
Figure 10:
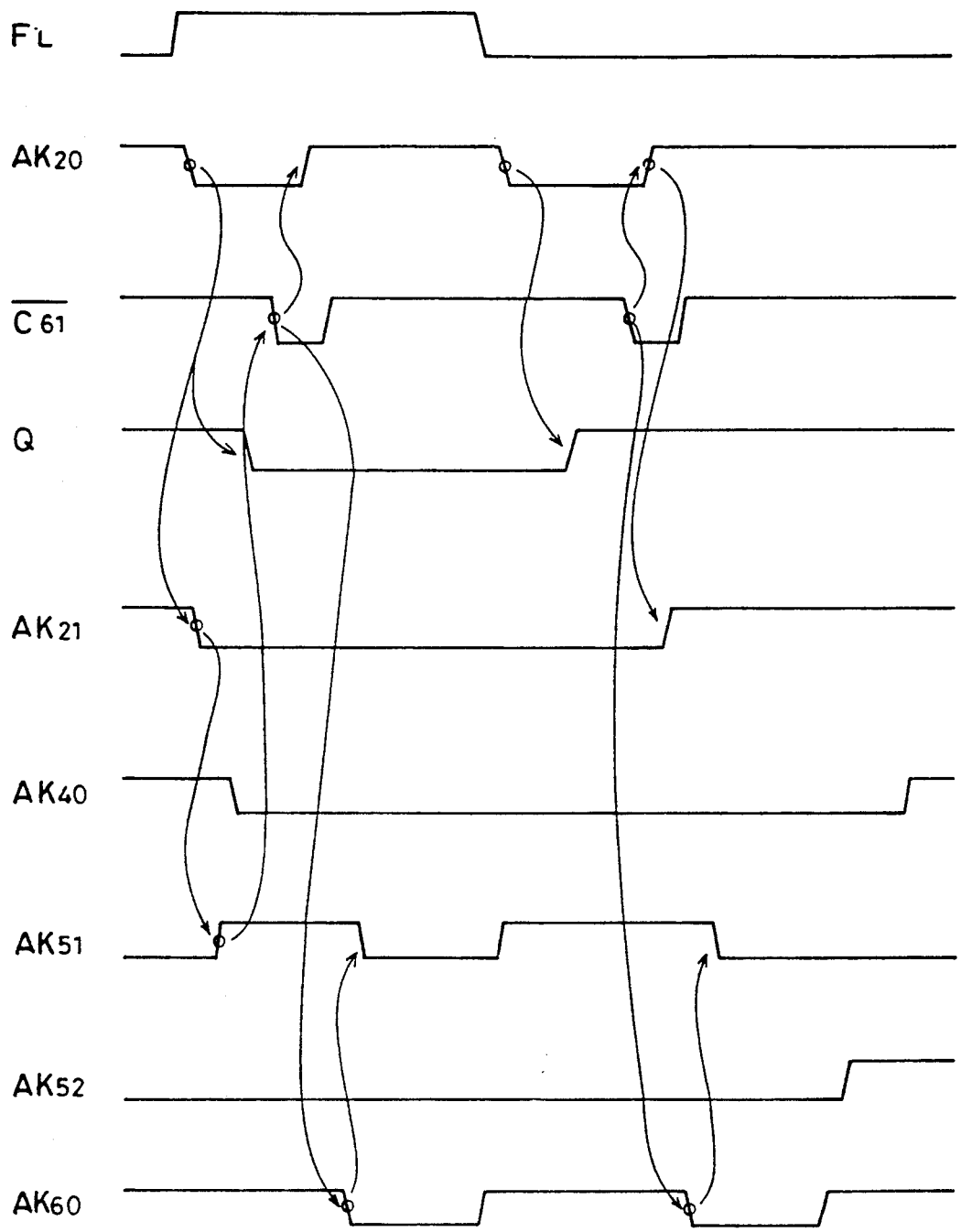

In this case, the flag FL included in a packet is set to "0" as shown in FIG. 9. First, when a packet arrives at the data transmission path 20, the transmission acknowledging signal AK20 falls to a "L" level (inhibited state), so that the transmission acknowledging signal AK21 output from the gate 84 attains a "L" level. As a result, the transmission acknowledging signal AK51 output from the arbitration portion 50 attains a "H" level (permission state). The transmission signal $\overline{C61}$ falls to a "L" level, whereby the packet is transmitted from the data transmission path 20 to the memory control portion 60.

The transmission acknowledging signal AK20 attains a "H" level (permission state) after a lapse of fixed time, so that the transmission acknowledging signal AK21 output from the gate 84 attains a "H" level.

The memory control portion 60 causes the transmission acknowledging signal AK60 to fall to a "L" level (inhibited state) in response to the fall of the transmission signal $\overline{C61}$. As a result, the transmission acknowledging signal AK51 output from the arbitration portion 50 falls to a "L" level.

When a packet arrives at the data transmission path 40, the transmission acknowledging signal AK40 attains a "L" level (inhibited state). However, the transmission acknowledging signal AK51 having previously attained a "H" level before prevents the transmission acknowledging signal AK52 from attaining a "H" level. Thereafter, the transmission acknowledging signal AK51 attains a "L" level, the transmission acknowledging signal AK60 attains a "H" level and the transmission acknowledging signal AK52 attains a "H" level.

The packet shown in FIG. 2A is transmitted one by one to the memory control portion 60 in the order of arrival in this way.

Description will now be given of a case where two packets are successively transmitted as shown in FIG. 2B.

It is also assumed herein that a first packet arrives at the data transmission path 20 and then, a packet arrives at the data transmission path 40.

In this case, the flag FL of the first packet shown in FIG. 2B is set to "1".

When the first packet arrives at the data transmission path 20, the transmission acknowledging signal AK20 falls to a "L" level. As a result, the transmission acknowledging signal AK21 output from the gate 84 falls to a "L" level and the transmission acknowledging signal AK51 output from the arbitration portion 50 attains a "H" level (permission state). In addition, the output signal Q of the flip-flop 81 attains a "L" level. The transmission signal $\overline{C61}$ falls to a "L" level and the data transmission path 20 transmits the first packet to the memory control portion 60. Thereafter, the transmission acknowledging signal AK20 rises to a "H" level. The transmission acknowledging signal AK60 output from the memory control portion 60 falls to a "L" level in response to the fall of the transmission signal $\overline{C61}$. As a result, the transmission acknowledging signal AK51 attains a "L" level.

When the packet arrives at the data transmission path 40, the transmission acknowledging signal AK40 falls to a "L" level. However, the transmission acknowledging signal AK52 remains low because of the transmission acknowledging signal AK21 having previously attained a "L" level.

Then, when the second packet arrives at the data transmission path 20, the transmission acknowledging signal AK20 falls to a "L" level. As a result, the output signal Q of the flip-flop 81 rises to a "H" level. When the transmission acknowledging signal AK60 output from the memory control portion 60 attains a "H" level, the transmission acknowledging signal AK51 attains a "H" level. As a result, the transmission signal C61 falls to a "L[ level, so that the second packet is transmitted from the data transmission path 20 to the memory control portion 60.

In response to the fall of the transmission signal $\overline{C61}$, the transmission acknowledging signal AK20 and the transmission acknowledging signal AK21 attain a "H" level. In addition, the transmission acknowledging signal AK60 and the transmission acknowledging signal AK51 attain a "L" level.

Thereafter, when the transmission acknowledging signal AK60 rises to a "H" level, the transmission acknowledging signal AK52 attains a "H" level. As a result, the packet is transmitted from the data transmission path 40 to the memory control portion 60.

The first and the second packets having arrived at the data transmission path 20 are successively transmitted to the memory control portion 60 and then, the packets having arrived at the data transmission path 40 is transmitted to the memory control portion 60 in this way.

In the above described embodiment, the operation of the word number control portion 80 is not affected by the state ("1" or "0") of the flag FL of the second packet shown in FIG. 2B.

Figure 11:
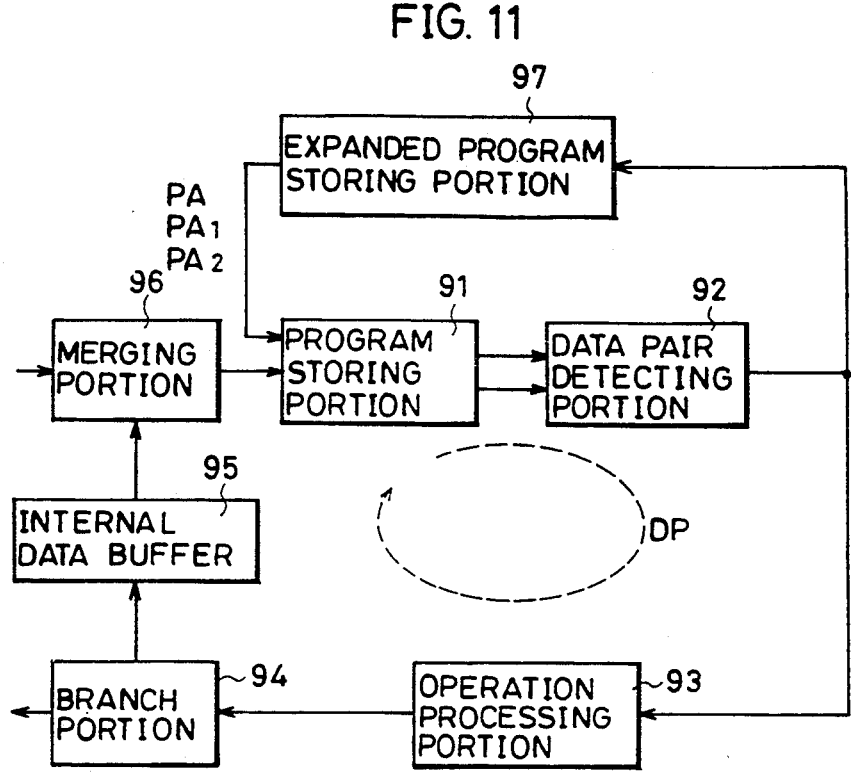
FIG. 11 is a block diagram showing an arrangement of a data flow type information processor to which the data transmission apparatus according to the present invention is applied.
Figure 12:
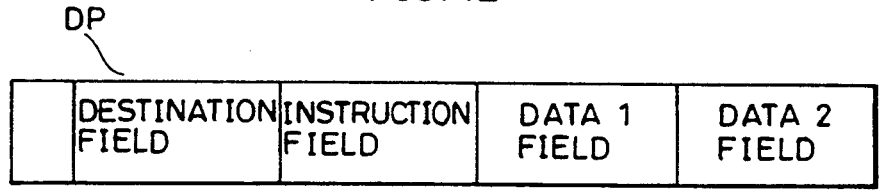
FIG. 12 is a diagram showing a field arrangement of a data packet to be processed in the data flow type information processor.

The data transmission apparatus according to the present invention is applicable to a data flow type information processor, for example. FIG. 11 is a block diagram showing one example of an arrangement of a data flow type information processor. FIG. 12 is a diagram showing one example of a field arrangement of a data packet to be processed by the information processor.

A data packet DP shown in FIG. 12 includes a destination field, an instruction field, a data 1 field and a data 2 field. The destination field stores destination information, the instruction field stores instruction information and the data 1 field or the data 2 field stores operand data.

Figure 13:
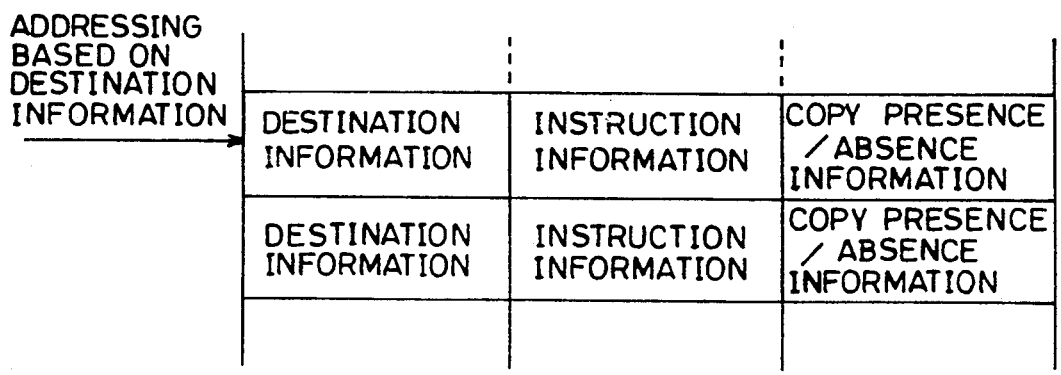
FIG. 13 is a diagram showing a part of a data flow program stored in a program storing portion of the data flow type information processor.

In FIG. 11, a program storing portion 91 stores a data flow program shown in FIG. 13. Each row of the data flow program comprises destination information, instruction information and copy presence/absence information. The program storing portion 91 reads the destination information, the instruction information and the copy presence/absence information of the data flow program as shown in FIG. 13 by addressing based on the destination information of an input data packet, stores the destination information and the instruction information in the destination field and the instruction field of the data packet, respectively, and outputs the data packet.

A data pair detecting portion 92 queues data packets output from the program storing portion 91. More specifically, when the instruction information indicates a 2 input instruction, the data pair detection portion detects two different data packets having the same destination information, stores the operand data of one of the data packets (the contents of the data 1 field shown in FIG. 12) in the data 2 field of the other data packet, and outputs the other data packet. When the instruction information indicates a 1 input instruction, the data pair detecting portion outputs the input data packet without modification.

An operation processing portion 93 performs an operation processing based on instruction information with respect to a data packet output from the data pair detecting portion 92, stores the result of the operation processing in the data 1 field of the data packet, and outputs the data packet to a branch portion 94. The branch portion 94 applies the data packet through an internal data buffer 95 to a merging portion 96 or externally outputs the same. The merging portion 96 outputs the data packet from the internal data buffer 95 or the external data packet to the program storing portion 91 in the order of arrival.

As the data packets continue to circulate through the program storing portion 91, the data pair detecting portion 92, the operation processing portion 93, the branch portion 94, the internal data buffer 95, the merging portion 96 and the program storing portion 91 ..., the operation processing proceeds based on the data flow program stored in the program storing portion 91.

Figure 14:
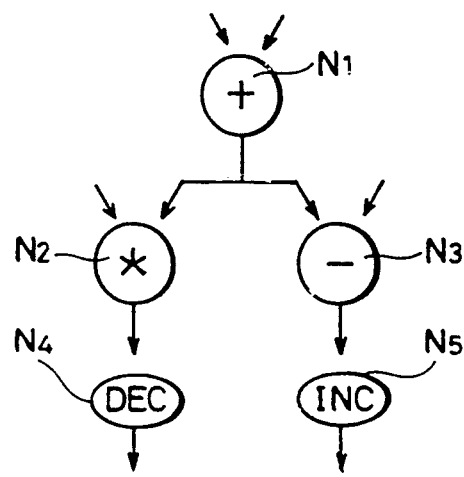
FIG. 14 is a diagram showing a part of a data flow graph including copy processing.

FIG. 14 is a diagram showing one example of a data flow graph. In FIG. 14, nodes N1, N2 and N3 denote instructions of addition, multiplication, and substraction, respectively. Nodes N4 and N5 denote instructions of decrement and increment, respectively. The instructions of the nodes N1, N2 and N3 are 2 input instructions and the instructions of the nodes N4 and N5 are 1 input instructions. The operation result of the node N1 is referred to by the nodes N2 and N3. In this case, a copy processing is performed in the program storing portion 1.

The copy processing will now be described. First, the contents of a row addressed based on the destination information of an input data packet are read out from the data flow program. At this time, when the copy presence/absence information indicates "absence", a data packet is output with the contents of its destination field and instruction field updated to complete the processing.

Conversely, when the copy presence/absence information indicates "presence", a data packet is output with the contents of its destination field and instruction field updated, and the destination information, the instruction information and the copy presence/absence information stored in the subsequent row are read out. The same data as that of the input data packet is stored in the data 1 field of another data packet, the destination information and the instruction information which have been just read out are respectively stored in the destination field and the instruction field of said another data packet, and said another data packet is output.

An expanded program storing portion 97 stores a data flow program of the same form as that of the data flow program shown in FIG. 13. When a data packet output from the data pair detecting portion 92 is input to the expanded program storing portion 97, the data flow program is read out by addressing based on the destination information of that data packet and loaded in the program storing portion 91.

Figure 15A:
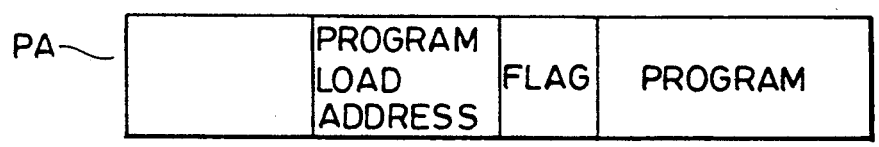
FIGS. 15A and 15B are diagrams showing field arrangements of data packets loaded from an expanded program storing portion to a program storing portion.

FIG. 15A shows a field arrangement of a data packet loaded from the expanded program storing portion 97 into the program storing portion 91. A data packet PA includes a program load address, a flag and a program. The program load address indicates an address in the program storing portion 91 in which the program is loaded. The flag indicates the number of data packets to be successively loaded. The program includes destination information, instruction information and copy presence/absence information.

Figure 15B:
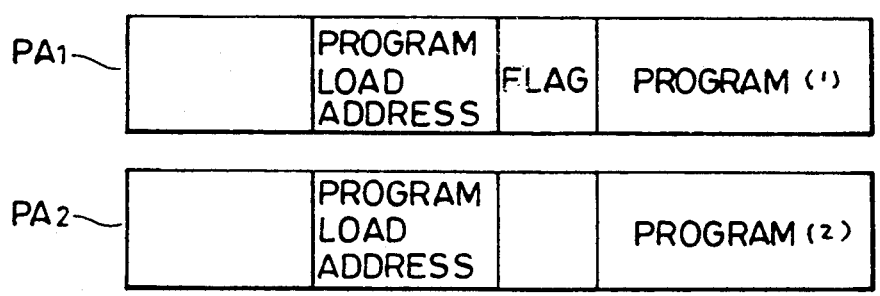
Figure 16:
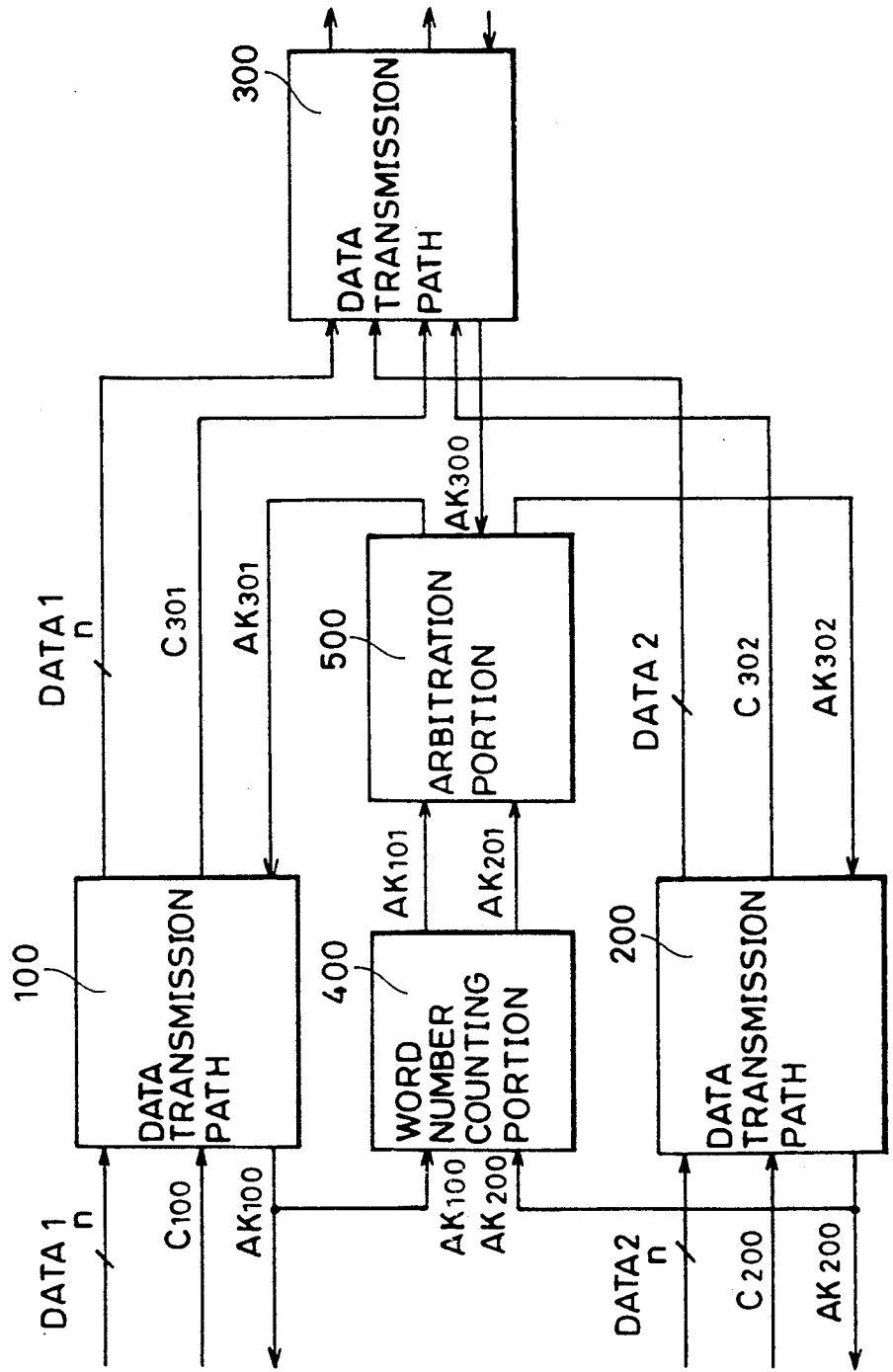
FIG. 16 is a block diagram showing an arrangement of a conventional data transmission apparatus.

For a copy processing, a row to be addressed and the subsequent row are read out, and therefore, a plurality of data packets should be collectively loaded from the expanded program storing portion 97 into the program storing portion 91. FIG. 15B shows field arrangements of two data packets to be collectively loaded. A data packet PA1 includes a program load address, a flag and a program (1) A data packet PA2 includes a program load address and a program (2). The flag of the data packet PA1 indicates that two data packets are successively loaded.

Application of the data transmission apparatus according to the present invention to the input portion of the program storing portion 91 enables transmission of data packets applied from the merging portion 96 and the data packets loaded from the expanded program storing portion 97 to the program memory in the order of arrival and it also allows data packets to be successively loaded from the expanded program storing portion 97 to dynamically change in number according to a flag.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transmission apparatus for transmitting packets, flowing through a plurality of preceding stage portions provided in parallel with each other, to a succeeding stage portion, any of the packets having packet number information indicative of ho many packets are to be successively transmitted, the data transmission apparatus comprising:

arbitrating means for directing transmission of the packets flowing through the plurality of preceding stage portions to the succeeding stage portion in order of arrival of the packets; and controlling means, coupled to said arbitrating means, for dynamically changing the number of packets to be successively transmitted from one of the preceding stage portions to the succeeding stage portion, based on the packet number information.

2. The data transmission apparatus according to claim 1, wherein each of the plurality of preceding stage portions has a data transmission path including first transmitting means for performing a hand-shaking type data transmission, and the succeeding stage portion has a data transmission path which includes second data transmitting means for performing handshaking type data transmission.

3. The data transmission apparatus according to claim 2, wherein said controlling means directs said arbitrating means to maintain control of transmission of the packets until one or a plurality of the packets to be successively transmitted are transmitted to the succeeding stage portion based on the packet number information.

4. A data flow type information processor in which an operation processing is carried out by data sequentially transmitted through data transmission apparatuses to a plurality of processing portions based on a data flow program, at least one of the data transmission apparatuses transmitting packets flowing through a plurality of preceding stage portions provided in parallel with each other, to a succeeding stage portion, any of the packets having packet number information indicative of how many packets are to be successively transmitted, said at least one of the data transmission apparatuses comprising:

arbitrating means for directing transmission of the packets flowing through the plurality of preceding stage portions to the succeeding stage portion in order of arrival of the packets; and controlling means, coupled to said arbitrating means, for dynamically changing the number of packets to be successively transmitted from one of the preceding stage portions to the succeeding stage portion, based on the packet number Information.

5. A data transmission apparatus for transmitting packets, flowing through a plurality of preceding stage portions provided in parallel with each other, to a succeeding stage portion, any of the packets having packet number information indicative of how many packets are to be successively transmitted, each of the plurality of preceding stage portions and the succeeding stage portion generating a transmitting acknowledging signal when a packet-receivable state is entered and generating a transmission inhibiting signal when a packet is received, the data transmission apparatus comprising:

at least one controlling means, provided corresponding to at least one of the plurality of preceding stage portions, for each generating a transmission inhibiting control signal, in response to receipt of a transmission inhibiting signal applied from the corresponding preceding stage portion; and at least one arbitrating means, coupled to a corresponding one of said at least one controlling means, for applying a transmission acknowledging control signal to the corresponding preceding stage portion, in response to receipt of the transmission inhibiting control signal applied from said at least one controlling means or a transmission inhibiting signal from the preceding stage portions, after receipt of a transmission acknowledging signal from the succeeding stage portion, said at least one controlling means directing said at lest one arbitrating means to apply the transmission acknowledging control signal until the packets are successively transmitted to the succeeding stage portion, in response to the packet number information.

6. The data transmission apparatus according to claim 5, wherein each of the plurality of preceding stage portions includes first transmitting means for performing hand-shaking type data transmission, and the succeeding stage portion includes second transmitting means for performing hand-shaking type data transmission.

7. A control apparatus for controlling transmission of packets from a preceding stage portion to a succeeding stage portion, the preceding stage portion and the succeeding stage portion generating a transmission acknowledging signal when in a packet-receivable state and generating a transmission inhibiting signal when receiving a packet, any of the packets including packet number information indicative of how many packets are to be successively transmitted, the control apparatus comprising:

counting means for counting the transmission inhibiting signals;

signal generating means for generating and supplying a transmission acknowledging control signal to the preceding stage portion in response to a transmission inhibiting signal applied from the preceding stage portion; and controlling means for directing said signal generating means to maintain its state until the number of packets counted by said counting means equals the packet number information.

8. The control apparatus according to claim 7, wherein the preceding stage portion includes first transmitting means for performing hand-shaking type data transmission, and the succeeding stage portion includes second transmitting means for performing hand-shaking type data transmission.

9. A method of operating a data transmission apparatus for transmitting packets, flowing through a plurality of preceding stage portions provided in parallel with each other, to a succeeding stage portion, any of the packets including packet number information indicative of how many packets are to be successively transmitted, the method comprising the steps of:

transmitting the packets flowing through the plurality of preceding stage portions to the succeeding stage portion in the order of arrival; and dynamically changing the number of packets to be successively transmitted from one of the preceding stage portions to the succeeding stage portion in accordance with the packet number information.

10. A method of operating a control apparatus for controlling transmission of packets from a preceding stage portion to a succeeding stage portion, any of the packets including packet number information indicative of how many packets are to be successively transmitted, the preceding stage portion and the succeeding stage portion generating a transmission acknowledging signal when in a packet-receivable state and generating a transmission inhibiting signal when receiving a packet, the method comprising the steps of:

counting the number of transmission inhibiting signals;

applying a transmission acknowledging control signal to the preceding stage portion in response to receipt of a transmission inhibiting signal from the preceding stage portion; and maintaining the transmission acknowledging control signal applied for the preceding stage portion until the counted number equals the packet number information.

* * * * *